United States Patent [19]

Nakajima

[11] Patent Number: 5,637,937

[45] Date of Patent: Jun. 10, 1997

[54] SUPER-MINIATURE MOTOR

[75] Inventor: Fumio Nakajima, Tanashi, Japan

[73] Assignee: Citizen Watch Co., Ltd., Tokyo, Japan

[21] Appl. No.: 397,188

[22] PCT Filed: Nov. 30, 1993

[86] PCT No.: PCT/JP93/01739

§ 371 Date: Mar. 9, 1995

§ 102(e) Date: Mar. 9, 1995

[87] PCT Pub. No.: WO95/15610

PCT Pub. Date: Jun. 8, 1995

[51] Int. Cl.$^6$ .............. H02K 7/10; H02K 1/12; H01L 41/04

[52] U.S. Cl. .............. 310/40 MM; 310/328; 310/254

[58] Field of Search ............. 310/40 MM, 309, 310/71, 154, 156, 254, 300, 311, 313 A

[56] References Cited

U.S. PATENT DOCUMENTS 4,453,103 6/1984 Vishnevsky et al. .......... 310/323

5,432,644 7/1995 Tajima et al. .......... 360/99.04

FOREIGN PATENT DOCUMENTS 61-177155 8/1986 Japan.

Primary Examiner—Steven L. Stephan
Assistant Examiner—Michael Wallace, Jr.
Attorney, Agent, or Firm—Kanesaka & Takeuchi

[57] ABSTRACT

A super-minuature motor used as a driving motor in super-precision miniature machines is disclosed. The motor is constructed from a rotating member 1 made from a permanent magnet, actuators 8–13 which can be moved or displaced by a charged energy, and starters 2–7 made from a magnetic material which are surrounding the outer periphery of the rotating member and movable along with the movement of the actuators toward the direction of the diameter. This construction enables a super-minuature motor to be manufactured even smaller and to minimize the electricity consumption of the motor.

9 Claims, 3 Drawing Sheets

SUPER-MINIATURE MOTOR

BACKGROUND OF THE INVENTION

1. Field of the Invention

The present invention relates to a super-minuature motor used as a driving motor in super-precision minuature machines and the like and, particularly, to a super-miniature pulse motor which is miniaturized by excluding exciting coils.

2. Background Art

Conventionally, driving motors for super-precision miniature machines, for example, miniature motors used as driving motors of quartz crystal watches, are constructed, in the same manner as in large motors, from exciting coils consisting of copper wires wound around a part of a stators such that the motor is rotated by a driving force created by charging an exiting current to the exciting coils.

Thus, exciting coils are required for conventional miniature motors to generate a driving force. In the case where the exciting coils are used, a considerable number of windings is required for the coils. If the diameter of the wires for the coils is reduced to as small as 10 μm or less for the purpose of miniaturization of the motors, the coils tend to be easily broken, making it extremely difficult to wind the coils around the starter.

Accordingly, the exciting coils must be inevitably thick and large, and it is very difficult to miniaturize motors as a whole.

An object of the present invention is therefore to provide a super-miniature motor which is miniaturized by excluding exciting coils, which prevents motors from being miniaturized.

DISCLOSURE OF THE INVENTION

The super-miniature motor of the present invention is constructed from a rotating member made from a permanent magnet, actuators which can be moved or displaced by a charged energy, and stators made from a magnetic material which are surrounding the outer periphery or both the upper and bottom surfaces of the rotating member, and movable along with the movement of the actuators in the radial direction of the motor.

A plural number of actuators are successively charged with a voltage as an energy source for changing distances between the corresponding stators and the rotating member to change a magnetic suction force. This change in the magnetic suction force causes the rotating member to rotate either clock-wise or counter clock-wise direction of the rotation axis thereof.

In the super-miniature motor of the present invention in which the driving force is acquired by changing gaps between the rotating member and the stators by the actuators which can be moved or displaced by a charged energy, there are no need for a larger-sized exciting coil for charging an exiting current. Thus, a super-miniature motor which is even smaller than existing small-sized motors can be provided by the present invention.

BRIEF DESCRIPTION OF THE DRAWINGS

FIGS. 1–6 are drawings of the super-miniature motors of the present invention, in which FIG. 1 is a plan view of the super-miniature motor of the first embodiment while the motor is at rest; FIG. 2 is a plan view of the super-miniature motor of the first embodiment while the motor is rotated by one step; FIG. 3 is a sectional view of the super-miniature motor of the second embodiment taken along line 3—3 in FIG. 4, while the motor is at rest; FIG. 4 is a plan view of the super-miniature motor of the second embodiment sectioned along line 4—4 in FIG. 3, while the motor is at rest; FIG. 5 is a sectional view of the super-miniature motor of the second embodiment taken along line 5—5 in FIG. 6, while the motor is rotated by one step; and FIG. 6 is a plan view of the super-miniature motor of the second embodiment sectioned along line 6—6 in FIG. 5, while the motor is rotating.

BEST MODE FOR CARRYING OUT THE INVENTION

Figure 1:
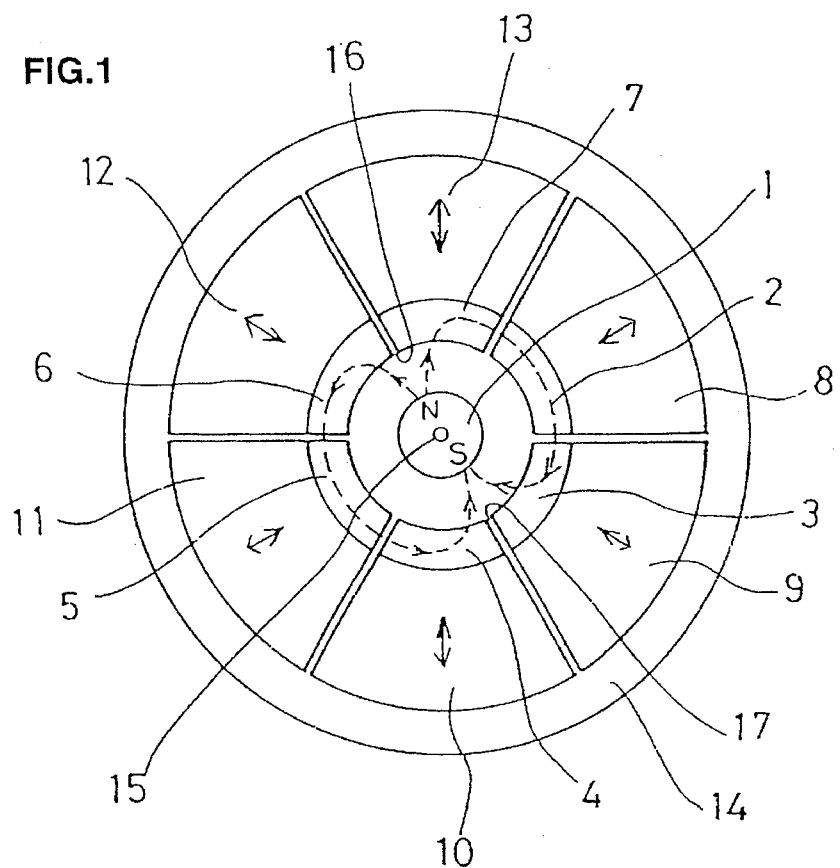

The embodiments of present invention is hereinafter described referring to the drawings. The present invention shall not be construed as being limited by these embodiments.

Figure 2:
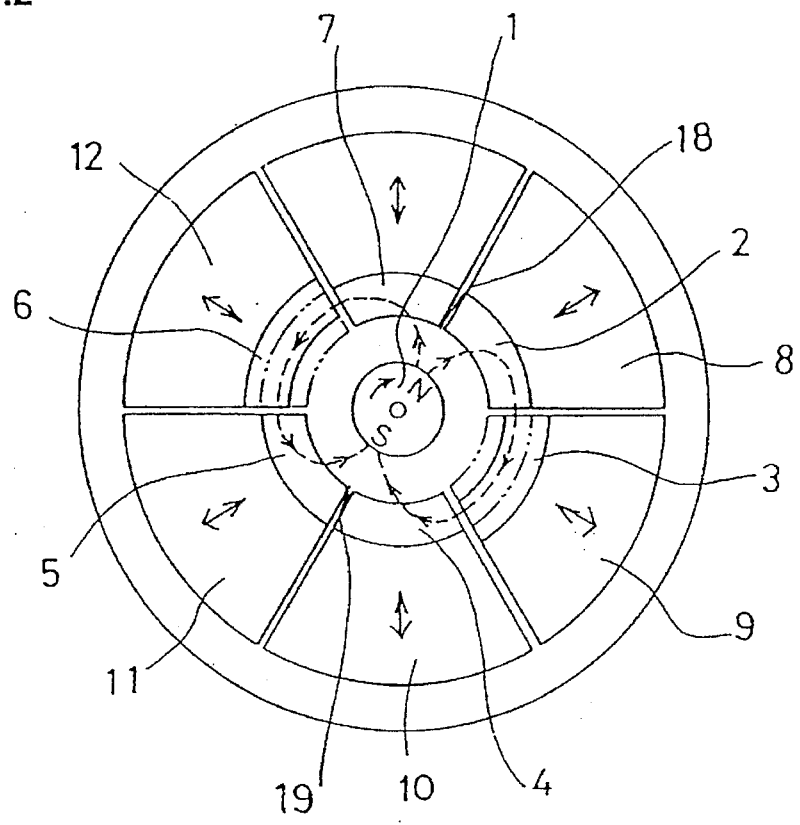

In FIGS. 1 and 2, there are shown plan views of the first embodiment of the super-miniature motor, in which FIG. 1 shows the state where the motor is at rest and FIG. 2 shows the state when the motor is rotated by one step.

As shown in FIG. 1, rotating member 1, consisting of a permanent magnet having a pair of magnetic poles, which are N-pole and S-pole, is provided rotatably around a rotation axis 15. Stators 2, 3, 4, 5, 6, and 7 are arranged so as to surround the outer periphery of rotating member 1. Further, provided outside these stators are actuators 8, 9, 10, 11, 12, and 13, for example, of piezoelectric members, each corresponding to stators 2, 3, 4, 5, 6, and 7, respectively. Each end, i.e. inner end, of these actuators 8, 9, 10, 11, 12, and 13 is adhered to each of the corresponding stators 2, 3, 4, 5, 6, and 7, respectively, and each other end, i.e. outer end of the actuators is connected to a frame 14. Since the actuators 8, 9, 10, 11, 12, and 13 are made of piezoelectric members, when electricity is applied to the actuators, the actuators are moved in the direction of the diameter as shown by arrows. Although not shown in FIG. 1, the actuators are constructed so as to move back and fourth in the direction of the diameter by charging a voltage between two electrodes of the piezoelectric member of each actuator. Rotating member 1 is at rest in a stable manner at a place where the magnetic potential in the magnetic circuit constructed by the rotating member 1 and the stators 2, 3, 4, 5, 6, and 7 is minimum. Supposing that the N-pole of rotating member 1 is at gap 16 between the stators 6 and 7, and the S-pole is at gap 17 between the stators 3 and 4, as shown in FIG. 1, one of the magnetic flux from the N-pole of rotating member 1 returns to the S-pole via the stators 6, 5, 4, and the other magnetic flux returns to S-pole via the stators 7, 2, 3. Interim gaps between the stators in either course are two, and are thus minimized. Accordingly, the magnetic resistances and the magnetic potentials are minimized.

On the other hand, if the N-pole of rotating member 1 is positioned at the center of starter 7 and the S-pole at the center of starter 4, one of the magnetic flux from the N-pole of rotating member 1 returns to the S-pole via the stators 7, 6, 5, 4, and the other magnetic flux returns to the S-pole via the stators 7, 2, 3, 4. Interim gaps between the stators in both courses are three. Because of this, the magnetic resistances and the magnetic potentials are large, and the rotating member cannot stand still at this point. The stable points, therefore, coincide to the place of gaps between the stators.

In a condition as shown in FIG. 1, if a voltage is applied to actuators 9 and 12, i.e. piezoelectric members, via electrodes, not shown in the Figure, so as to contract these actuators 9 and 12 along the direction of the diameter, the stators 3 and 6 are moved externally according to the movements or contractions of actuators 9 and 12, respectively. This expands the gap between the N-pole of rotating member 1 and starter 6, and the gap between the S-pole of rotating member 1 and starter 3, so that the magnetic resistances between these gaps become large.

Because the magnetic resistance between the N-pole of rotating member 1 and starter 7 and the magnetic resistance between the S-pole of rotating member 1 and starter 4 remain the same, a gradient in the magnetic potential is created so as to decrease the overall magnetic resistance.

As a result, rotating member 1 rotates clockwise by one step (60°) due to the rotational force, and, as shown in FIG. 2, stably rests at a point from gap 18 between the stators 7 and 2 and gap 19 between the stators 4 and 5, where the magnetic resistance is minimum.

The voltage may be applied to the actuators until the time when the rotating member rests stationary, or it may be applied for a shorter period of time.

The voltage application to actuators 9 and 12 is then terminated to return the stators 3 and 6 to the original positions, while a voltage is applied to actuators 10 and 13 to move the stators 4 and 7 outwardly for rotating the rotating member by one step of 60° in the same manner as above. The rotating member is thus rotated one round in six steps.

Figure 3:
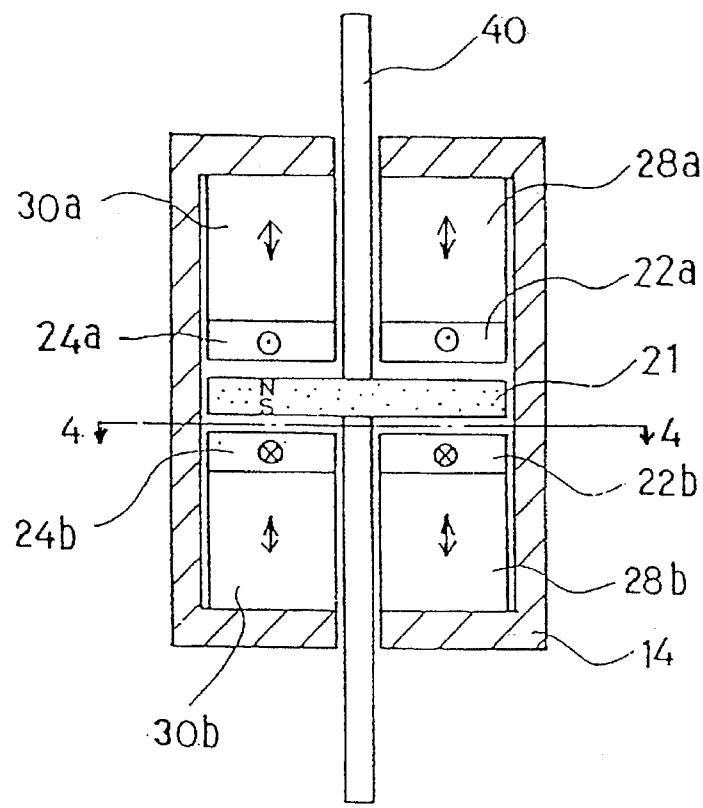
Figure 4:
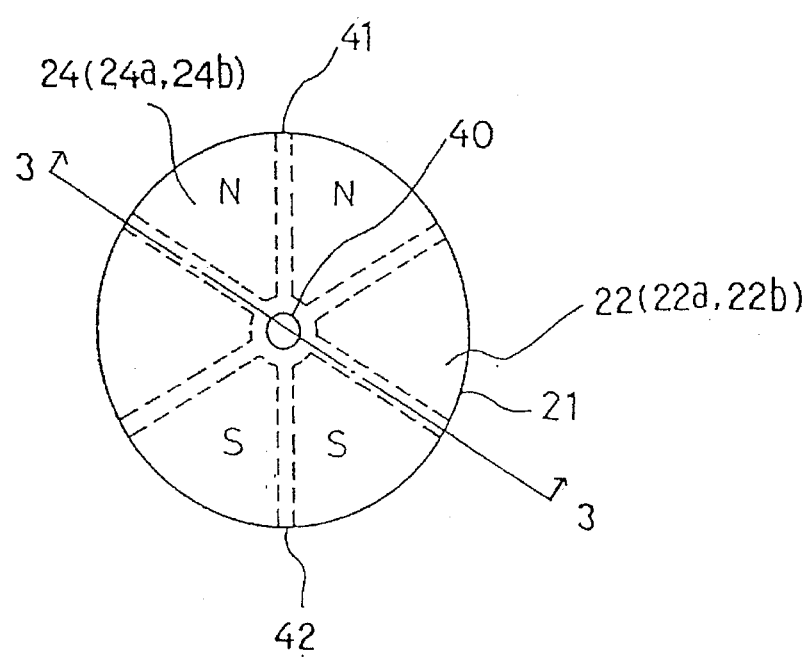
Figure 5:
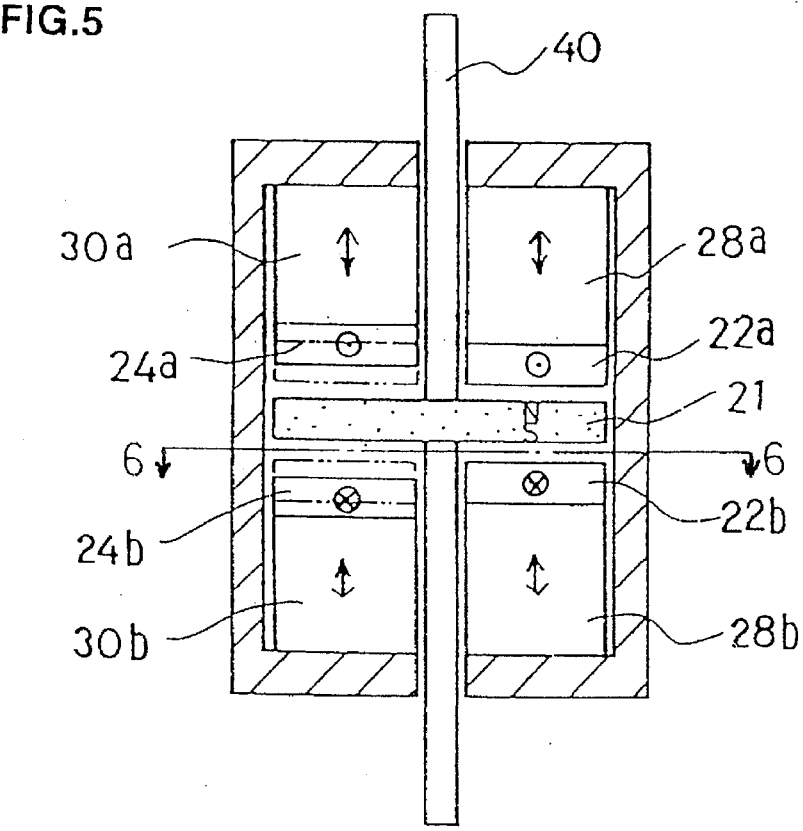
Figure 6:
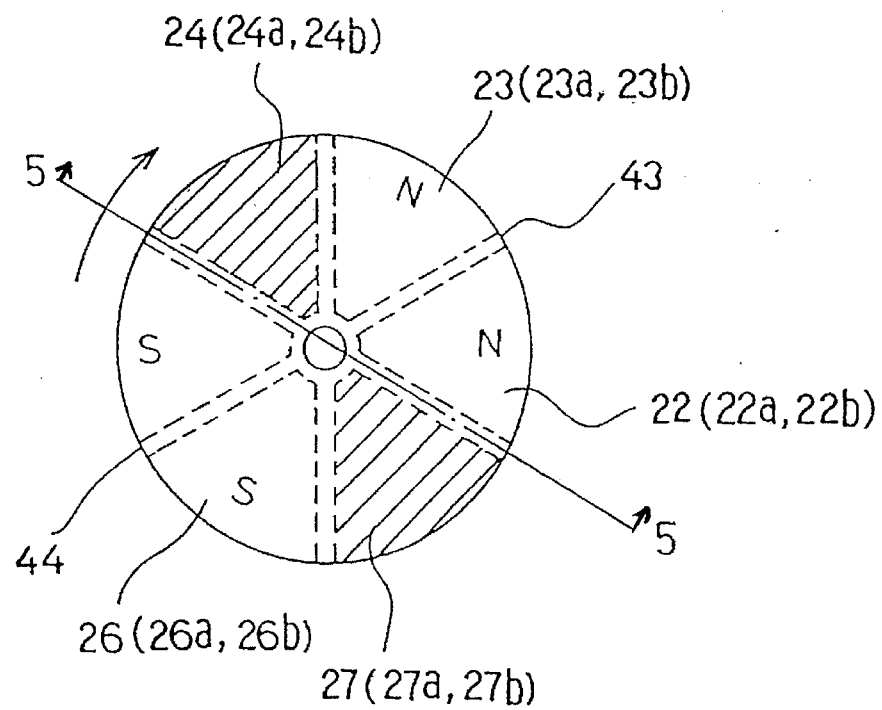

FIGS. 3–6 are drawings showing the super-miniature motor of the second embodiment of the present invention, wherein FIGS. 3 and 4 are a sectional view and a plan view, respectively, while the motor is at rest; and FIGS. 5 and 6 are a sectional view and a plan view when the motor is rotated by one step. The second embodiment is now illustrated with reference to FIGS. 3, 4, 5, and 6.

As shown in FIG. 3, the rotating element 21 consisting of a permanent magnet having two pairs of poles, four poles in total, two N-poles and two S-poles, being directed to the axis, is provided rotatably around a rotation axis 40. Further provided above an upper surface and below a bottom surface of the rotating member 21 are six stators, 22 (22a, 22b), 23 (23a, 23b), 24 (24a, 24b), 25 (25a, 25b), . . ., each consisting of a magnetic material. Still further provided corresponding respectively to the stators 22, 23, 24, 25, . . ., are actuators, 28 (28a, 28b), 29 (29a, 29b), 30 (30a, 30b), 31 (31a, 31b), . . ., consisting, for example, of piezoelectric element. Each one of the terminals of these actuators, 28, 29, 30, 31, . . . is respectively adhered to each of the stators 22, 23, 24, 25, . . ., and the other terminal is adhered to frame 14.

FIG. 4 is a plan view sectioned along the plane 4—4 of FIG. 3.

In the same manner as the first embodiment described referring to FIGS. 1 and 2, the N-pole of rotating member 21 shown in FIG. 4 stands still at gap 41 between the stators as the stationary point, and the S-pole stands still at gap 42 as the stationary point. Here, a sectional view sectioned along the plane 3—3 corresponds to the sectional view shown in FIG. 3.

As shown in FIG. 5, when a voltage is applied so as to contract actuators 30a, 30b (and 33a, 33b) corresponding to stators 24a, 24b and the starters axially asymmetric to these stators (starters 27a, 27b shown in FIG. 6), in the axial direction, gaps from the stators 24a, 24b, 27a, 27b to rotating member 21 are expanded and magnetic resistances are caused to change, as discussed in connection with the first embodiment. The change in the magnetic potential thus produced creates a rotational force, which rotates rotating member 21 by 60° and causes it to stand still at stationary points 43, 44, as shown in FIG. 6.

Then, the stators 24a, 24b, 27a, 27b are returned to the original positions, while the stators 23a, 23b, 26a, 26b are moved. Thus, rotating member 21 is rotated one round in six steps in the same manner as in the first embodiment.

Although examples in which six or twelve stators are used are illustrated in the first and second embodiments above, the number of the stators are not limited to six or twelve. The use of minimum two stators is possible, if the time for which a voltage is applied to the actuators is appropriately selected. Also, the stators are not limited to those with two or four poles. Any the stators with more than a single pole (N pole or S pole) can be used.

It is possible to change the output of the motors in these embodiments by altering gaps between the rotating member and the stators through the change in the voltage applied to the actuators which are moved or displaced along with the starters.

Any materials exhibiting piezoelectric characteristics, such as piezoelectric ceramics (barium titanate, lead zirconate-tatanate, mult-component solution ceramics), monocrystals of barium titanate, quartz crystals, Rochelle salts, and the like can be used as a piezoelectric material for the actuators in these embodiments.

Further, it is possible to fabricate the combination of stators and actuators as monomorph, unimorph, bimorph, or multimorph of bending displacement type or as linear displacement lamination type, in order to widen the degree of displacement of the stators and to reduce the driving voltage.

The super-miniature motors of the present invention are not necessarily limited to pulse motors. It is possible to fabricate continuous motors by continuously applying the voltage. In particular, fabrication of a continuous motor with a low electricity consumption is possible if a resonance frequency by the stators and actuators is used.

Although embodiments using a piezoelectric element as actuators are illustrated in the descriptions above, any materials which can be moved or displace by input energy, such as a shape memory alloy, can be used as a material for the actuators.

Furthermore, although embodiments illustrated above are related to those using a permanent magnet as the rotating member and a magnetic material as the stators, it is possible to use a magnetic material as the rotating member and a permanent magnet as the stators.

INDUSTRIAL APPLICABILITY

As illustrated above, the super-miniature motor of the present invention can be used as a driving motor for quartz crystal watches, robots for medical and welfare applications, medical mechatronics, microrobots, and the like.

I claim:
1. A super-miniature motor comprising:
a rotating member made from a permanent magnet and rotating around a central axis thereof,
a frame situated outside the rotating member,
actuators made from a piezoelectric element, each actuator having an outer end fixed to the frame and an inner end extending toward the rotating member perpendicular to the central axis and being actuated such that when a charged energy is applied to each actuator, the inner end moves toward or away from the rotating member, and
stators made from a magnetic material, each stator being fixed to the inner end of each actuator to surround an outer periphery of the rotating member, a gap being formed between each stator and the rotating member so that when the actuators are moved in radial directions relative to the central axis by applying the charged energy to the actuators, widths of the gaps change to thereby rotate the rotating member.

2. A super-miniature motor according to claim 1, wherein said rotating member and stators form a magnetic circuit with a magnetic potential, said magnetic potential being changed when the stators are moved, to thereby rotate the rotating member.

3. A super-miniature motor according to claim 2, wherein said actuators and stators are arranged symmetrically relative to the central axis, two of the actuators symmetrically to the central axis being actuated at one time for rotating the rotating member.

4. A super-miniature motor comprising:

a rotating member made from a permanent magnet and rotating around a central axis thereof, said rotating member having upper and bottom surfaces and at least one pair of poles on each surface, a frame situated outside the rotating member, actuators situated at at least one of an upper surface side and a bottom surface side of the rotating member, each actuator having an outer end fixed to the frame and an inner end extending toward the rotating member parallel to the central axis and being actuated such that when a charged energy is applied to each actuator, the inner end moves in toward or away from the rotating member, stators made from a magnetic material, each stator being fixed to the inner end of each actuator to cover at least one of the upper and bottom surfaces of the rotating member, a gap being formed between each stator and the rotating member so that when the actuators are moved parallel to the central axis by applying the charged energy to the actuators, widths of the gaps change to thereby rotate the rotating member.

5. A super-miniature motor according to claim 4, wherein said rotating member and stators form a magnetic circuit with a magnetic potential, said magnetic potential being changed when the stators are moved, to thereby rotate the rotating member.

6. A super-miniature motor according to claim 4, wherein said actuators are made from piezoelectric elements so that the inner ends of the actuators are moved parallel to the central axis by application of electricity.

7. A super-miniature motor according to claim 6, wherein the actuators and the stators are arranged around the central axis and are also arranged symmetrically relative to the rotating member on both sides thereof.

8. A super-miniature motor according to claim 7, wherein said rotating member is formed of two pairs of permanent magnets, poles of the permanent magnet being oriented parallel to the central axis.

9. A super-miniature motor according to claim 7, wherein two of said actuators and stators arranged symmetrically relative to the rotating member are actuated at one time for rotating the rotating member.

* * * * *